US012403868B2

(12) United States Patent
McCabe et al.

(10) Patent No.: US 12,403,868 B2
(45) Date of Patent: Sep. 2, 2025

(54) WORK VEHICLE WITH EXTERIOR DEBRIS REMOVAL SYSTEM

(71) Applicant: CNH Industrial America LLC, New Holland, PA (US)

(72) Inventors: Kenneth McCabe, Romeoville, IL (US); Sean Steuck, Greendale, WI (US)

(73) Assignee: CNH Industrial America LLC, New Holland, PA (US)

( * ) Notice: Subject to any disclaimer, the term of this patent is extended or adjusted under 35 U.S.C. 154(b) by 335 days.

(21) Appl. No.: 18/091,636

(22) Filed: Dec. 30, 2022

(65) Prior Publication Data

US 2024/0217486 A1 Jul. 4, 2024

(51) Int. Cl.
*B60S 1/66* (2006.01)
*F01N 13/00* (2010.01)

(52) U.S. Cl.
CPC .............. *B60S 1/66* (2013.01); *F01N 13/002* (2013.01); *B60Y 2200/221* (2013.01)

(58) Field of Classification Search
CPC ......................................................... B60S 1/66
See application file for complete search history.

(56) References Cited

FOREIGN PATENT DOCUMENTS

EP 1086866 * 3/2001 ............... B60S 1/66

* cited by examiner

*Primary Examiner* — Jason Y Ko
(74) *Attorney, Agent, or Firm* — Rickard K. DeMille; Rebecca L. Henkel

(57) ABSTRACT

A work vehicle includes: a chassis; a cab carried by the chassis, the cab including a plurality of walls and a door movably coupled to at least one of the walls, the walls and the door together enclosing a cab interior, the door being movable between a closed position and an open position; a pressurized fluid source carried by the chassis and configured to output pressurized fluid; and at least one nozzle disposed outside the cab interior, directed at an area adjacent to the door, and fluidly couplable to the pressurized fluid source such that output pressurized fluid from the pressurized fluid source is directed towards the area adjacent to the door by the at least one nozzle to remove debris adjacent to the door.

20 Claims, 4 Drawing Sheets

WORK VEHICLE WITH EXTERIOR DEBRIS REMOVAL SYSTEM

FIELD OF THE INVENTION

The present invention pertains to work vehicles and, more specifically, to work vehicles with cabs.

BACKGROUND OF THE INVENTION

Work vehicles, such as tractors, are often used to perform a variety of tasks that involve debris. In agricultural applications, for example, dirt and residue from a field may be stirred up by the work vehicle and/or carried implements and collect on the work vehicle. Users typically control the work vehicle from a cab and debris inside the cab can make the cab an uncomfortable environment for the user. While many work vehicles have heating ventilation and air conditioning (HVAC) systems that include filters to reduce the amount of dirt, dust, and other debris that makes it into the cab, there are still instances where a significant amount of debris makes it into the cab and leads to user discomfort.

What is needed in the art is a way to reduce the amount of debris that makes it into the cab of a work vehicle.

SUMMARY OF THE INVENTION

Exemplary embodiments provided according to the present disclosure provide a work vehicle with one or more nozzles that are disposed outside of a cab of the work vehicle and directed towards an area adjacent to a door to remove debris adjacent to the door.

In some embodiments provided according to the present disclosure, a work vehicle includes: a chassis; a cab carried by the chassis, the cab including a plurality of walls and a door movably coupled to at least one of the walls, the walls and the door together enclosing a cab interior, the door being movable between a closed position and an open position; a pressurized fluid source carried by the chassis and configured to output pressurized fluid; and at least one nozzle disposed outside the cab interior, directed at an area adjacent to the door, and fluidly couplable to the pressurized fluid source such that output pressurized fluid from the pressurized fluid source is directed towards the area adjacent to the door by the at least one nozzle to remove debris adjacent to the door.

In some exemplary embodiments provided according to the present disclosure, a method of removing debris from an area adjacent to a door of a cab of a work vehicle is provided. The work vehicle includes a chassis, the cab being carried by the chassis and including a plurality of walls and the door coupled to at least one of the walls, the walls and the door together enclosing a cab interior, the door being movable between a closed position and an open position. The work vehicle further includes a pressurized fluid source carried by the chassis and configured to output pressurized fluid. The method includes outputting pressurized fluid from the pressurized fluid source at the area adjacent to the door using at least one nozzle that is disposed outside the cab interior, directed at the area adjacent to the door, and fluidly coupled to the pressurized fluid source to remove the debris adjacent to the door.

One possible advantage that may be realized by exemplary embodiments provided according to the present disclosure is that debris can be removed from the area adjacent to the door to reduce the risk that opening and closing of the door will draw debris into the cab interior.

Another possible advantage that may be realized by exemplary embodiments provided according to the present disclosure is that debris can be removed from the area before the door will be opened and closed, to further reduce the risk of debris being drawn into the cab interior.

Yet another possible advantage that may be realized by exemplary embodiments provided according to the present disclosure is that the pressurized fluid system may be a system of the work vehicle that performs a different function, such as an exhaust treatment system, to reduce or eliminate the need to include a further compressor or other element that would add significant weight to the work vehicle.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
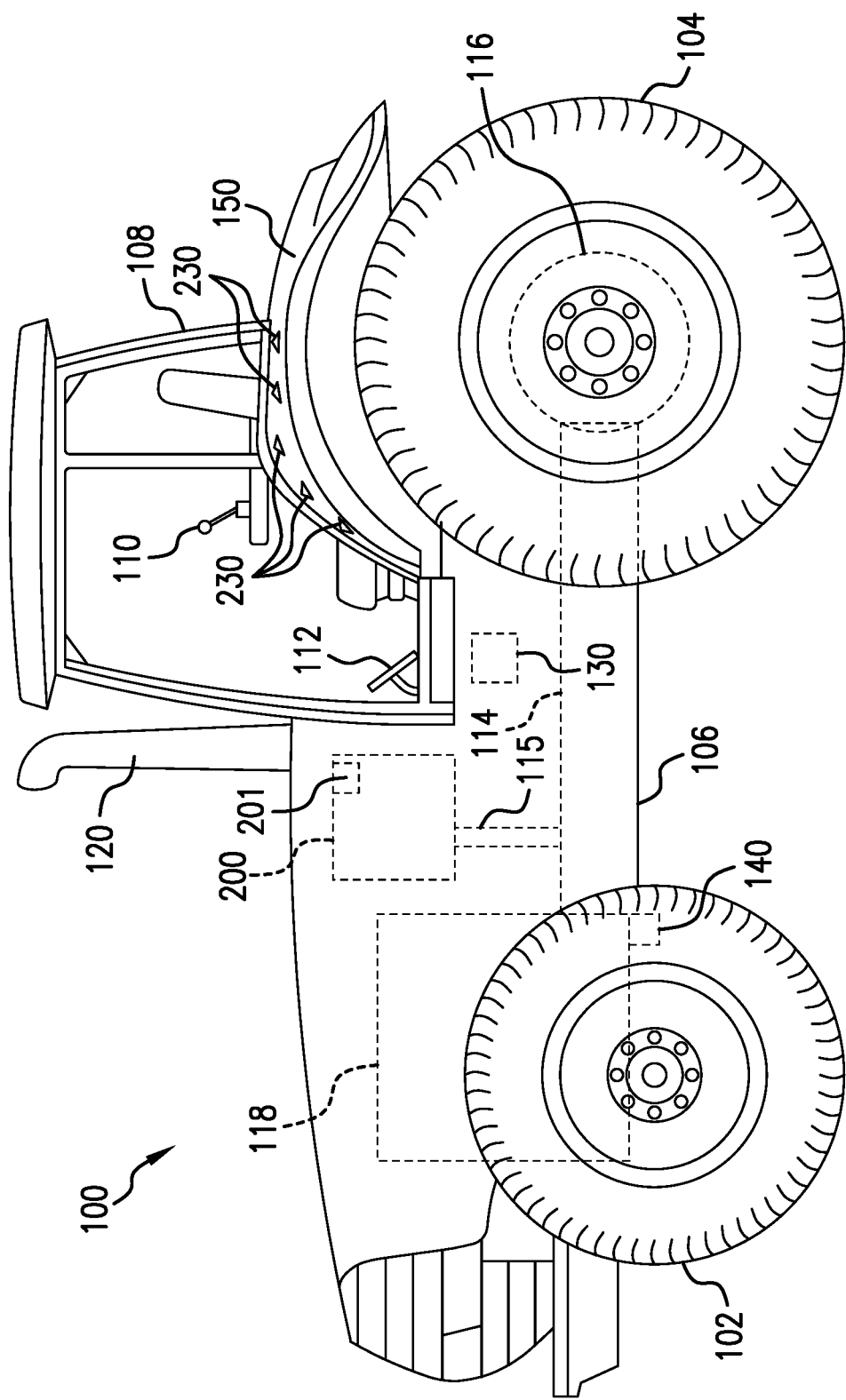
FIG. 1 illustrates a side view of an exemplary embodiment of a work vehicle included a cab provided according to the present disclosure in the form of a tractor.

Referring now to the drawings, FIG. 1 illustrates a side view of one embodiment of a work vehicle 100. As shown, the work vehicle 100 is configured as an agricultural tractor. However, in other embodiments, the work vehicle 100 may be configured as any other suitable work vehicle known in the art, such as various other agricultural vehicles, earth-moving vehicles, road vehicles, all-terrain vehicles, off-road vehicles, loaders, and/or the like.

As shown in FIG. 1, the work vehicle 100 includes a pair of front wheels 102, a pair of rear wheels 104, and a chassis 106 coupled to and supported by the wheels 102, 104. A cab 108 is carried the chassis 106 and may house various control devices 110, 112 (e.g., levers, pedals, control panels and/or the like) for permitting an operator to control the operation of the work vehicle 100. Additionally, the work vehicle 100 may include an engine 114 and a transmission 116 mounted on the chassis 106. The transmission 116 may be operably coupled to the engine 114 and may provide variably adjusted gear ratios for transferring engine power to the wheels 104 via a differential 118.

Moreover, the work vehicle 100 may also include an exhaust treatment system 200 for reducing the amount emissions contained within the exhaust from the engine 114. For instance, engine exhaust gas emitted by the engine 114 may be directed through the exhaust treatment system 200 to allow the levels of nitrous oxide (NOx) emissions contained within the exhaust to be reduced significantly. The cleaned or treated exhaust gases may then be expelled from the exhaust treatment system 200 into the surrounding environment via a clean exhaust 120, which may include a pipe as illustrated in the work vehicle 100. The exhaust treatment system 200 includes a catalytic reducer 201 that is coupled to an outlet 115 of the engine 114, either directly or indirectly via one or more other elements of the exhaust treatment system 200, and configured to produce cleaned exhaust gas from the engine exhaust gas.

It should be appreciated that the configuration of the work vehicle 100 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 114, transmission 116, and differential 118 are coupled, a configuration common in smaller tractors. Still, other configurations may use an articulated chassis to steer the work vehicle 100 or rely on tracks in lieu of the wheels 102, 104. Additionally, although not shown, the work vehicle 100 may also be configured to be operably coupled to any suitable type of work implement, such as a trailer, spray boom, manure tank, feed grinder, plow, and/or the like.

Figure 2:
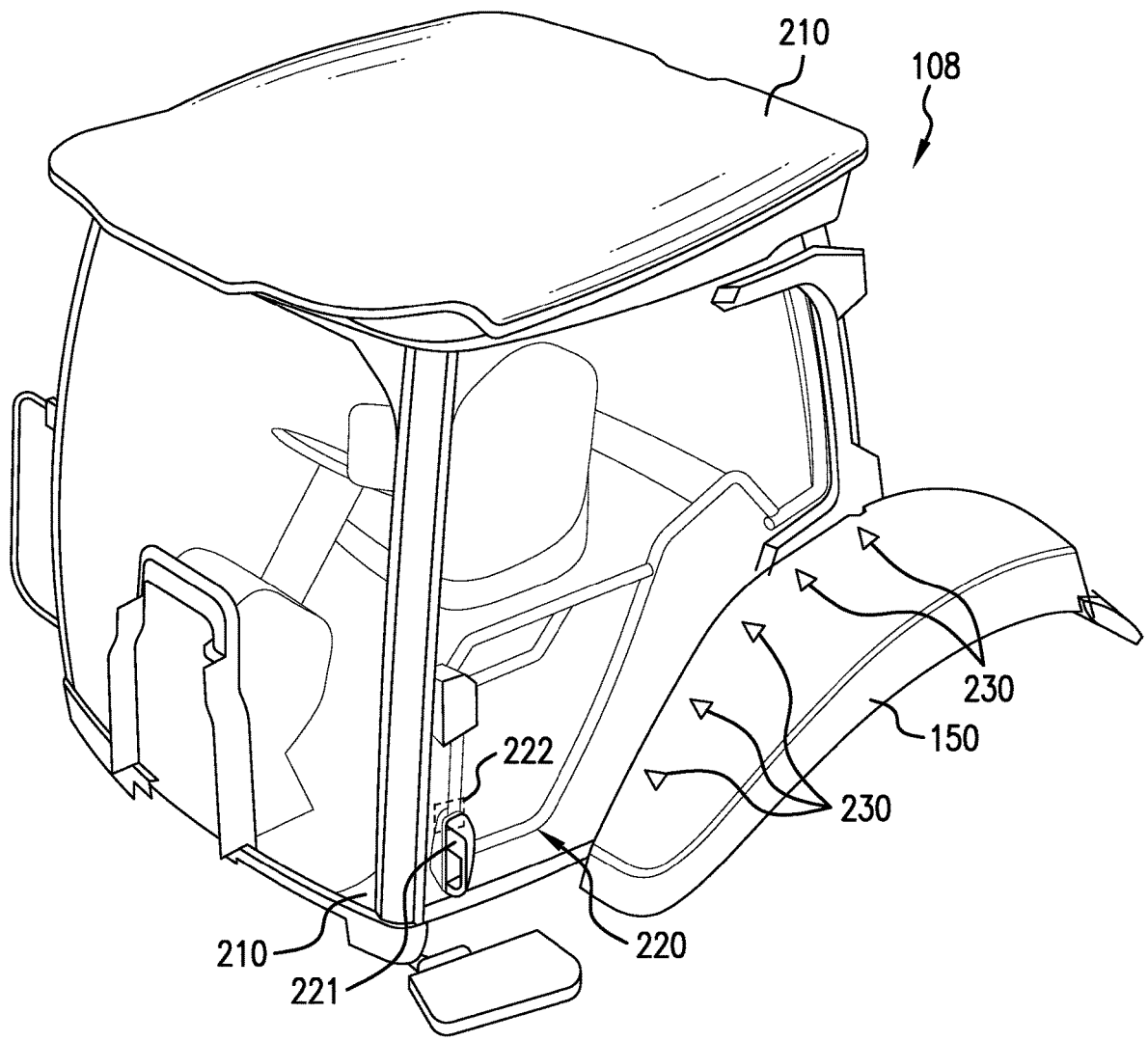
FIG. 2 illustrates a perspective view of the cab of FIG. 1 with a plurality of nozzles directed at an area adjacent to a door of the cab.

Referring specifically now to FIG. 2, the cab 108 is illustrated in further detail. The cab 108 includes a plurality of walls 210 and a door 220 that is movably coupled to at least one of the walls 210. The walls 210 and the door 220 together enclose a cab interior, where the control devices 110, 112 are housed. The door 220 is movable between a closed position, where the cab interior is generally enclosed, and an open position, where the cab interior is accessible by a user. The door 220 may, for example, be hinged to one of the walls 210 so the door 220 can swing outwardly relative to the cab interior and allow a user to leave the cab interior.

In known work vehicles, debris tends to accumulate on various surfaces of the work vehicle. When the door opens and closes, debris can be drawn into the cab interior due to the movement of the door acting as a sail that aerosolizes debris and directs it into the cab interior. The amount of drawn-in debris can be significant, leading to user complaints due to the cab interior looking dirty as well as potentially irritating the user's respiratory system.

Figure 4:
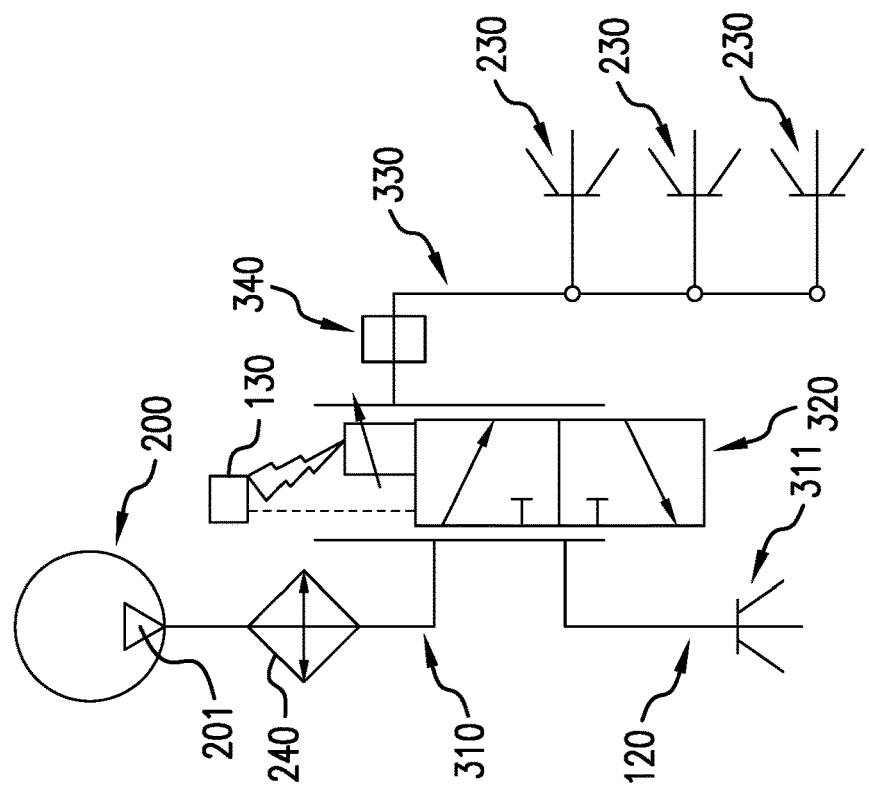
FIG. 4 illustrates the fluid flow diagram of FIG. 3 with the actuatable valve in a second state.
Figure 3:
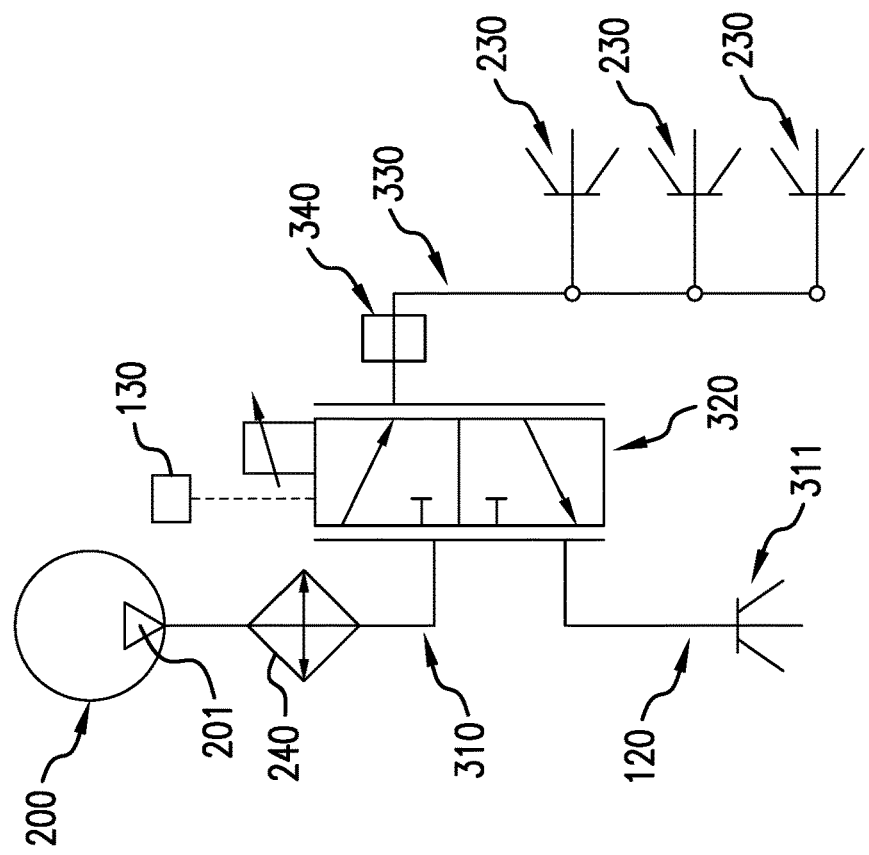
FIG. 3 illustrates a fluid flow diagram of fluid from a pressurized fluid source to the nozzles of FIG. 2 with an actuatable valve that is in a first state.

To address the previously described issues with known work vehicles, and referring still to FIGS. 1-2 and now FIGS. 3-4 as well, the work vehicle 100 includes a pressurized fluid source that is carried by the chassis 106 and configured to output pressurized fluid and at least one nozzle, illustrated as a plurality of nozzles 230, disposed outside the cab interior, directed at an area adjacent to the door 220, and fluidly couplable to the pressurized fluid source such that output pressurized fluid from the pressurized fluid source is directed towards the area adjacent to the door 220 by the nozzle(s) 230 to remove debris adjacent to the door 220. As used herein, "pressurized fluid" refers to any fluid, e.g., gas or liquid, that has a fluid pressure greater than atmospheric pressure so the pressurized fluid is expelled from the nozzle(s) 230 to remove debris adjacent to the door 220. The area "adjacent to the door 220" may be any area of the work vehicle 100 where debris may accumulate and then be drawn into the cab interior when the door 220 opens and closes. For example, the door 220 may include one or more seals along its perimeter that engage one or more walls 210 to seal the cab interior when the door 220 is closed. The nozzle(s) 230 may be directed towards the seal(s), as well as an area around the seal(s), so the pressurized fluid removes debris that collects on the seal(s) and the surrounding area to reduce the risk that debris is drawn into the cab interior. Thus, the nozzle(s) 230 directing pressurized fluid from the pressurized fluid source towards the area adjacent to the door 220 can significantly reduce the risk of debris entering the cab interior, especially when the door 220 is opened and closed.

The pressurized fluid source can be provided in a variety of ways. In some embodiments, the pressurized fluid source is a compressor or similar element that compresses fluid, such as air, and is fluidly coupled to the nozzle(s) 230 so the compressed/pressurized fluid can be output by the nozzle(s) 230 to remove debris adjacent to the door 220. The compressor may, for example, be part of an HVAC system that controls the environment in the cab interior.

In some embodiments, such as the embodiment illustrated in FIGS. 1-4, the pressurized fluid source can be one or more elements of the exhaust treatment system 200. Particularly, the cleaned exhaust gas that is output from the catalytic reducer 201 may be used as the output pressurized fluid that is output by the nozzle(s) 230 to remove debris adjacent to the door 220. Specifically referring to FIGS. 3-4, it is illustrated how the exhaust treatment system 200 may be fluidly couplable to the nozzle(s) 230 in order to remove debris. The catalytic reducer 201 may be coupled to an exhaust port 311 of the clean exhaust 120 via a first fluid path 310 of the clean exhaust 120. The first fluid path 310 may be fluidly coupled to an actuatable valve 320, which may be a proportional solenoid valve or other type of valve. In some embodiments, a cooler 240 is also provided that is configured to cool down cleaned exhaust gas from the catalytic reducer 201, as is known.

The actuatable valve 320 may be configured to change from a first state, illustrated in FIG. 3, to a second state, illustrated in FIG. 4. In the first state, the cleaned exhaust gas from the catalytic reducer 201 flows through the first fluid path 310 out the exhaust port 311 of the clean exhaust 120 so the cleaned exhaust gas vents to the atmosphere from the exhaust port 311, similar to known vehicles. When the actuatable valve 320 changes from the first state to the second state, however, the cleaned exhaust gas tends to flow to a second fluid path 330 that is fluidly coupled to the nozzle(s) 230 so the cleaned exhaust gas is output by the nozzle(s) 230 and can remove debris adjacent to the door 220 as it is output to the atmosphere from the nozzle(s) 230. In this respect, the clean exhaust 120 is fluidly coupled to the nozzle(s) 230 by the actuatable valve 320 and the second fluid path 330 being fluidly coupled to the first fluid path 310 of the clean exhaust 120.

In some embodiments, a compressor 340 is provided that is configured to further compress cleaned exhaust gas and increase the pressure of the cleaned exhaust gas for outputting by the nozzle(s) 230. The compressor 340 may, for example, be fluidly coupled to the actuatable valve 320 on the side of the second fluid path 330 so only cleaned exhaust gas that will be output by the nozzle(s) 230 is further compressed by the compressor 340. In some embodiments, the compressor 340 can also act similarly to the actuatable valve 320 and control when cleaned exhaust gas is output to the atmosphere through the exhaust port 311 or the nozzle(s) 230.

Generally, the actuatable valve 320 fluidly couples the pressurized fluid source (the exhaust treatment system 200) to the nozzle(s) 230 through a fluid path (the second fluid path 330) between the pressurized fluid source 200 and the nozzle(s) 230, with the actuatable valve 320 defining a first state where the second fluid path 330 is closed to pressurized fluid from the pressurized fluid source and a second state where the second fluid path 330 is opened so the pressurized fluid is output by the nozzle(s) 230. In this respect, the actuatable valve 320 can be controlled in order to control pressurized fluid being output by the nozzle(s) 230 and remove debris adjacent to the door 220. To control the actuatable valve 320, a controller 130 may be provided that is operably coupled to the actuatable valve 320. The controller 130 is configured to output a first state signal so the actuatable valve 320 changes from the first state to the second state and output a second state signal so the actuatable valve 320 changes from the second state to the first state. As previously described, the actuatable valve 320 may be a proportional solenoid valve so the degree of openness of the actuatable valve 320 may be controlled, i.e., the actuatable valve 320 may be fully closed, partially open, or fully open. The actuatable valve 320 may be controlled by controlling current flow to the actuatable valve 320. For example, in the first state the actuatable valve 320 may be de-energized so the second fluid path 330 is closed, i.e., fully or mostly closed. In the second state, on the other hand, the actuatable valve 320 may be energized so the second fluid path 330 is opened, partially or fully, and fluidly coupled to the pressurized fluid source 200. In this respect, the controller 130 outputting the respective signals can control the actuatable valve 320 to close and open the second fluid path 330 and control whether cleaned exhaust gas is output by the exhaust port 311 or the nozzle(s) 230.

While debris may collect adjacent to the door 220 at any time, it may mostly be an issue when the door 220 is opened and closed, which can draw the debris into the cab interior. Thus, in some embodiments, the controller 130 may be configured to control the actuatable valve 320 so pressurized fluid is output by the nozzle(s) 230 when the door 220 is likely to open and close. To effect this type of control, the controller 130 may be configured to receive a door open signal indicative that the door 220 will be moving from the closed position to the open position and to output the second state signal responsively to receiving the door open signal. The controller 130 can be configured to receive the door open signal from a variety of sources. For example, the door open signal may be output by a sensor 222 that is associated with a door handle 221 that allows the door 220 to open from the closed position. As a user utilizes the door handle 221 to open the door 220, the controller 130 may receive the door open signal from the associated sensor 222 and output the second state signal so debris is removed. Such action can disperse some of the debris prior to the door 220 opening, reducing the amount of debris that is pulled into the cab interior.

However, it may be possible to further reduce, if not eliminate, the amount of debris that is pulled into the cab interior during opening and closing of the door 220. To further reduce the amount of debris pulled into the cab interior, the controller 130 may be configured to receive the door open signal from other sources that also indicate the door 220 is likely to be opened imminently. For example, the work vehicle 100 may include a service brake 140 that is configured to bring the work vehicle 100 to a stop upon activation and a service brake activator, which may be the control device 112, inside the cab interior that is configured to output a service brake activation signal that activates the service brake 140. The controller 130 may be operably coupled to the control device 112 so the controller 130 receives the service brake activation signal, which may also be the door open signal indicative that the door 220 will be moving from the closed position to the open position because the work vehicle 100 coming to a stop is indicative that the user may be planning to open the door 220 and exit the cab 108. By tying the output of the pressurized fluid through the nozzle(s) 230 to activation of the service brake 140, the debris can be removed from the area adjacent to the door 220 in advance of the user actually opening the door 220 so the debris is removed well before the door 220 opens, which can allow the debris to disperse from around the door 220.

In some embodiments, the controller 130 can additionally or alternatively be operably coupled to a speed sensor of the work vehicle 100 and configured to output the state signals as a function of the speed of the work vehicle 100. For example, the controller 130 may be configured to output the first state signal to fully close the actuatable valve 320 when the work vehicle 100 travels at a defined travel speed and output the second state signal when the work vehicle 100 travels below the defined travel speed. In some embodiments, the controller 130 may be configured to output the second state signal at multiple defined speeds so more pressurized fluid is output through the nozzle(s) 230 as the speed of the work vehicle 100 decreases, which is indicative that a user may be opening and closing the door 220 soon. It should thus be appreciated that the controller 130 provided according to the present disclosure can be configured in a variety of ways to remove debris adjacent to the door 220 so the debris does not wind up in the cab interior during opening and closing of the door 220.

The nozzle(s) 230 may be provided in a variety of configurations and locations to remove debris adjacent to the door 220. Many types of nozzles are known, and any suitable nozzle may be utilized according to the present disclosure. In the illustrated embodiment, there is provided a plurality of nozzles 230 that are disposed on a fender 150 of the work vehicle 100 that is carried by the chassis 106. The fender 150 may be a curved form of fiberglass that is disposed adjacent to the cab 108 and the rear wheel 104 that is on the same side as the door 220. The nozzles 230 may be mounted to the fender 150 in any suitable manner. In some embodiments, the fender 150 includes one or more openings formed therethrough to receive fluid lines that fluidly couple the nozzle(s) 230 to the pressurized fluid source. A plenum or similar element may also be provided so only one opening in the fender 150 is needed to supply pressurized fluid to each of the nozzles 230. Alternatively, one or more fluid lines to the nozzle(s) 230 may be provided without having to form openings through the fender 150, e.g., by running the lines across an edge of the fender 150 or elsewhere. In some embodiments, the nozzle(s) 230 is directed at an area of the fender 150 that is between the nozzle(s) 230 and the door 220 to remove debris from the fender 150, i.e., the area adjacent to the door 220 is a portion of the fender 150.

Further, the nozzles 230 may be directed in a variety of ways to remove debris adjacent to the door 220. In some embodiments, the nozzles 230 are directed at the door 220 and the area adjacent to the door 220 so the output pressurized fluid tends to entrain the debris and then deflect off the door 220 (or bodywork adjacent to the door 220) to remove the debris. However, it should be appreciated that the nozzles 230 can be directed at the area adjacent to the door 220 in other ways to remove debris. For example, the nozzles 230 may be disposed closely to the door 220, i.e., in the area adjacent to the door 220, and directed so the debris adjacent to the nozzles 230 is entrained by output pressurized fluid from the nozzles 230 and dispersed away from the door 220. It should thus be appreciated that the nozzles 230 can be provided in a variety of ways and locations to remove debris adjacent to the door 220.

Figure 5:
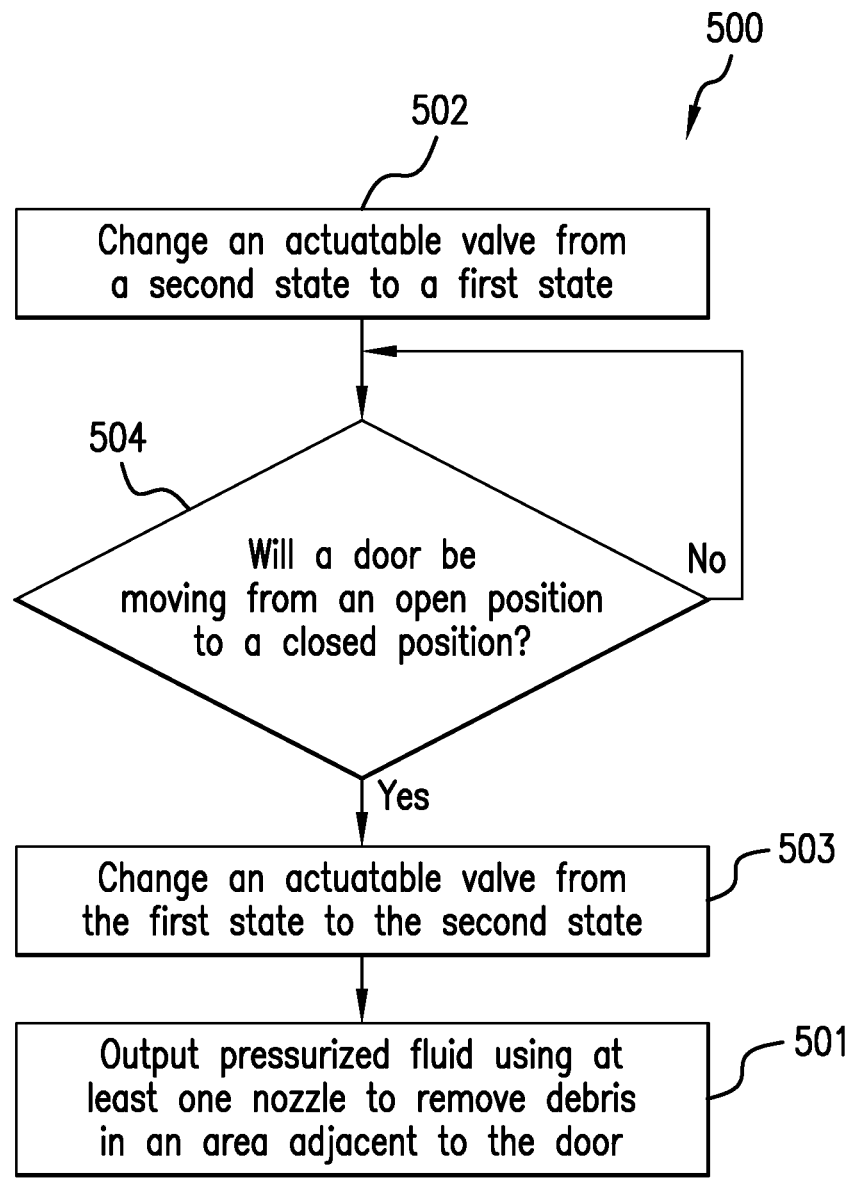
FIG. 5 illustrates a flow chart of an exemplary embodiment of a method of removing debris from the area adjacent to the door of the cab of FIGS. 1-2.

Referring now to FIG. 5, an exemplary embodiment of a method 500 of removing debris from the area of the work vehicle 100 adjacent to the door 220 is illustrated. The method 500 includes outputting 501 pressurized fluid from the pressurized fluid source 200 at the area adjacent to the door 220 using the at least one nozzle 230 to remove the debris in the area adjacent to the door 220. When the actuatable valve 320 is provided, the method 500 may further include changing 502 the actuatable valve 320 to the first state from the second state and changing 503 the actuatable valve to the second state from the first state. The method 500 may further include determining 504 that the door 220 will be moving from the closed position to the open position and changing 503 the actuatable valve to the second state from the first state responsively to the determining 504. The determining 504 may include, for example, activating the service brake 140.

From the foregoing, it should be appreciated that the work vehicle 100 provided according to the present disclosure utilizes one or more nozzles 230 to remove debris from an area adjacent to the door 220 of the cab 108. By removing the debris with pressurized fluid, such as cleaned exhaust gas, the amount of debris that gets drawn into the cab interior during opening and closing of the door 220 can be reduced. It should thus be appreciated that exemplary embodiments provided according to the present disclosure can reduce the risk of the cab interior becoming dirty, which can increase user comfort and satisfaction.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A work vehicle, comprising:
   a chassis;
   an engine carried by the chassis and comprising an outlet;
   a cab carried by the chassis, the cab comprising a plurality of walls and a door movably coupled to at least one of the walls, the walls and the door together enclosing a cab interior, the door being movable between a closed position and an open position;
   a pressurized fluid source carried by the chassis and configured to output pressurized fluid, wherein the pressurized fluid source comprises an exhaust treatment system comprising a catalytic reducer that is coupled to the outlet and configured to produce cleaned exhaust gas from engine exhaust gas emitted by the engine; and
   at least one nozzle disposed outside the cab interior, directed at an area adjacent to the door, and fluidly couplable to the pressurized fluid source such that the pressurized fluid from the pressurized fluid source is directed towards the area adjacent to the door by the at least one nozzle to remove debris adjacent to the door, wherein the exhaust treatment system further comprises a clean exhaust that is fluidly coupled to the at least one nozzle and is configured to exhaust the cleaned exhaust gas to the atmosphere.

2. The work vehicle of claim 1, wherein the pressurized fluid is the cleaned exhaust gas.

3. The work vehicle of claim 1, further comprising an actuatable valve fluidly coupling the clean exhaust to the at least one nozzle, the actuatable valve defining a first state where the cleaned exhaust gas is exhausted to the atmosphere through an exhaust port of the clean exhaust and a second state where the cleaned exhaust gas is exhausted to the atmosphere through the at least one nozzle.

4. The work vehicle of claim 1, further comprising an actuatable valve fluidly coupling the pressurized fluid source to the at least one nozzle through a fluid path between the pressurized fluid source and the at least one nozzle, the actuatable valve defining a first state where the fluid path is closed and a second state where the fluid path is opened.

5. The work vehicle of claim 4, further comprising a controller operably coupled to the actuatable valve, the controller being configured to:
   output a first state signal so the actuatable valve changes to the first state from the second state; and
   output a second state signal so the actuatable valve changes to the second state from the first state.

6. The work vehicle of claim 5, wherein the controller is further configured to receive a door open signal indicative that the door will be moving from the closed position to the open position, wherein the controller is configured to output the second state signal responsively to receiving the door open signal.

7. The work vehicle of claim 6, further comprising a service brake configured to bring the work vehicle to a stop upon activation and a service brake activator inside the cab interior and configured to output a service brake activation signal that activates the service brake, wherein the service brake activation signal is also the door open signal.

8. The work vehicle of claim 1, further comprising a fender carried by the chassis, wherein the at least one nozzle is coupled to the fender.

9. The work vehicle of claim 1, wherein the at least one nozzle comprises a plurality of nozzles fluidly coupled to the pressurized fluid source.

10. A method of removing debris from an area adjacent to a door of a cab of a work vehicle, the work vehicle comprising a chassis, the cab carried by the chassis and comprising a plurality of walls and the door coupled to at least one of the walls, the walls and the door together enclosing a cab interior, the door being movable between a closed position and an open position, the work vehicle further comprising a pressurized fluid source carried by the chassis and configured to output pressurized fluid, the work vehicle further comprising an engine carried by the chassis and comprising an outlet, the pressurized fluid source comprising an exhaust treatment system comprising a catalytic reducer that is coupled to the outlet and configured to produce cleaned exhaust gas from engine exhaust gas emitted by the engine, the method comprising:
   outputting pressurized fluid from the pressurized fluid source at the area adjacent to the door using at least one nozzle that is disposed outside the cab interior, directed at the area adjacent to the door, and fluidly coupled to the pressurized fluid source to remove the debris in the area adjacent to the door, wherein the exhaust treatment system further comprises a clean exhaust that is fluidly coupled to the at least one nozzle and is configured to exhaust the cleaned exhaust gas to the atmosphere.

11. The method of claim 10, wherein the pressurized fluid is the cleaned exhaust gas.

12. The method of claim 10, wherein the work vehicle further comprises an actuatable valve fluidly coupling the clean exhaust to the at least one nozzle, the actuatable valve defining a first state where the cleaned exhaust gas is exhausted to the atmosphere through an exhaust port of the clean exhaust and a second state where the cleaned exhaust gas is exhausted to the atmosphere through the at least one nozzle.

13. The method of claim 10, wherein the work vehicle further comprises an actuatable valve fluidly coupling the pressurized fluid source to the at least one nozzle through a fluid path between the pressurized fluid source and the at least one nozzle, the actuatable valve defining a first state where the fluid path is closed and a second state where the fluid path is opened.

14. The method of claim 13, further comprising:
changing the actuatable valve to the first state from the second state; and
changing the actuatable to the second state from the first state.

15. The method of claim 13, further comprising determining that the door will be moving from the closed position to the open position and changing the actuatable valve to the second state from the first state responsively to the determining.

16. The method of claim 15, wherein the work vehicle further comprises a service brake configured to bring the work vehicle to a stop upon activation, wherein the determining comprises activating the service brake.

17. The method of claim 10, wherein the work vehicle further comprises a fender carried by the chassis, wherein the at least one nozzle is coupled to the fender.

18. The method of claim 10, wherein the at least one nozzle comprises a plurality of nozzles fluidly coupled to the pressurized fluid source.

19. A work vehicle, comprising:
a chassis;
a cab carried by the chassis, the cab comprising a plurality of walls and a door movably coupled to at least one of the walls, the walls and the door together enclosing a cab interior, the door being movable between a closed position and an open position;
a pressurized fluid source carried by the chassis and configured to output pressurized fluid;
at least one nozzle disposed outside the cab interior, directed at an area adjacent to the door, and fluidly couplable to the pressurized fluid source such that the pressurized fluid from the pressurized fluid source is directed towards the area adjacent to the door by the at least one nozzle to remove debris adjacent to the door;
an actuatable valve fluidly coupling the pressurized fluid source to the at least one nozzle through a fluid path between the pressurized fluid source and the at least one nozzle, the actuatable valve defining a first state where the fluid path is closed and a second state where the fluid path is opened; and
a controller operably coupled to the actuatable valve, the controller being configured to:
output a first state signal so the actuatable valve changes to the first state from the second state; and
output a second state signal so the actuatable valve changes to the second state from the first state;
wherein the controller is further configured to receive a door open signal indicative that the door will be moving from the closed position to the open position, and the controller is configured to output the second state signal responsively to receiving the door open signal.

20. The work vehicle of claim 19, further comprising a service brake configured to bring the work vehicle to a stop upon activation and a service brake activator inside the cab interior and configured to output a service brake activation signal that activates the service brake, wherein the service brake activation signal is also the door open signal.

\* \* \* \* \*